Nov. 14, 1950 G. CHAUSSON 2,530,226
MOTOR VEHICLE BODY WITH INDEPENDENT WHEEL SUSPENSION
Filed Dec. 3, 1945
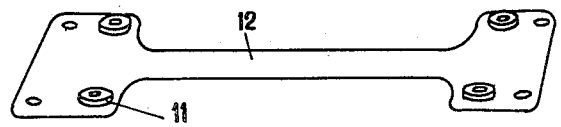
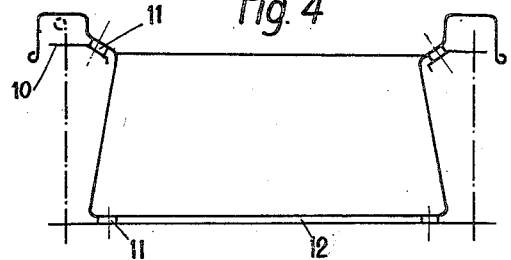
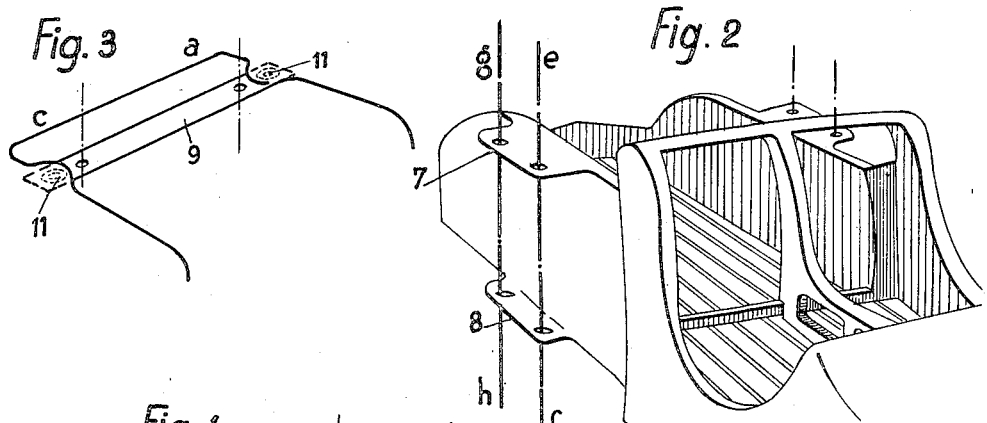
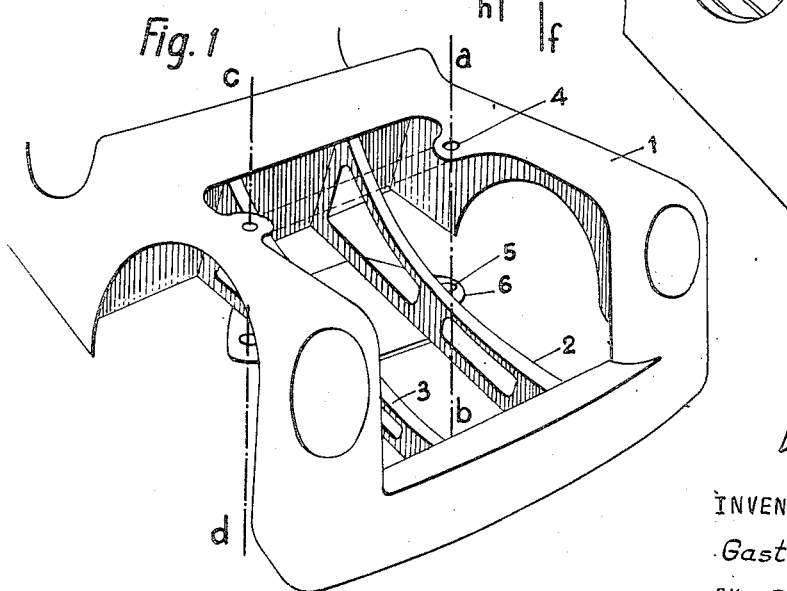
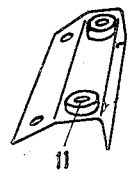
INVENTOR
Gaston Chausson
BY Richard y Geier
ATTORNEYS Patented Nov. 14, 1950

2,530,226

UNITED STATES PATENT OFFICE 2,530,226

MOTOR VEHICLE BODY WITH INDEPENDENT WHEEL SUSPENSION

Gaston Chausson, Asnieres, France, assignor to Societe Anonyme des Usines Chausson, Asnieres, France, a company of France Application December 3, 1945, Serial No. 632,490
In France May 13, 1943

Section 1, Public Law 690, August 8, 1946
Patent expires May 13, 1963

3 Claims. (Cl. 296—28)

It is known that the axles of motor vehicles undergo, when working, stresses acting on them in all directions. In motor vehicles without customary axles, consequently in those whose wheel suspension devices are directly secured to the body of the vehicle, it was necessary to provide a considerable strengthening of said devices, which again led to considerable increases of the weight.

The metal sheets of the usual thickness used for the body were generally considered as unfit for receiving the fastening points for fastening the wheel suspension devices and that, more particularly, because said sheets could support the stresses efficaciously only in a single plane.

This invention has for its object to provide a motor vehicle without customary axles comprising a body made totally or partially of a comparatively thin metal sheet, said vehicle being characterised in that the axes of the wheel suspension devices are mounted in points of the frame and/or of the body.

According to the invention, said suspension of wheels without customary axles is obtained by fastening each one of the wheel suspension devices at least in one point through using the metal sheet of the body.

According to another characteristic feature of the invention, the fastening points are to be chosen so that they lie near the wall of the body and, in fact, when parts of the latter are constituted by hollow beams, said fastening points are located in a particularly advantageous manner near those parts of the wall which carry the said hollow beams.

A particularly advantageous wheel suspension is obtained when said suspension is established in two points one of which lies near a wall surface which can receive substantially vertical stresses, while the other lies near a wall surface receiving substantially horizontal stresses.

The suspension in two points can also be effected so that one of these points practically receives all the occurring stresses. In this case the second suspension point serves only as an auxiliary suspension point which is little acted upon.

Further features and advantages of the invention will be gathered from the following specification and from the drawings, in which the invention is illustrated by way of example.

Fig. 1 is a perspective view of the front part of a body comprising frame elements for supporting the internal combustion engine.

Fig. 2 is a perspective view showing the rear part of a body without frame.

Figs. 3 and 4 show particular forms of execution of the subject-matter of the invention and Figs. 5 and 6 show details of the latter.

In the body 1 (see Fig. 1) which comprises the two longitudinal frame members 2, 3 receiving the internal combustion engine, the steering gear and still other elements of the equipment of the vehicle, points of suspension for the wheel suspension devices are provided on the axes $ab$ and $cd$. The upper points of suspension, flanges or supports 4 are provided in the metal sheet of the body 1 and the lower points of suspension 5 are provided in the free ends of a cross-piece 6 arranged below the frame members 2, 3. Both points of suspension 5 provided in the cross-piece 6 receive all the important stresses, while the points of suspension provided in the metal sheet of the body 1 serve only as auxiliary points of suspension.

The axis can also be replaced by a rocking frame on which suspension devices are arranged, for instance by means of helical springs or rubber blocks. Such a suspension can still be completed by a compensating or damping spring or by a plurality of similar springs the free ends of which are secured to the frame members 2, 3.

One can, therefore, use without any difficulty all the possible suspension devices and complete the latter, at will, by springs or torsion bars secured to the frame members supporting the engine.

The axes which form pivots serve then as guides during the vertical movements and the movements of rotation of the axle pin support.

As may be seen from Fig. 2, the suspension of the rear wheels can be effected in a quite corresponding manner, with the sole difference that it is not necessary to provide for a rotation of the wheels about a vertical axis.

Each one of the rear wheels can be suspended advantageously with the aid of two axes $ef$, $gh$ and that by means of supporting frames which always maintain said axes in a plane parallel to the axis of the vehicle.

The upper suspension points are then located in a metal sheet band or flange 7 bent from the side wall of the body and the lower suspension points are located in a metal sheet band or flange 8 which represents an extension of the floor of the body. With such an arrangement for the points of suspension, the upper suspension points substantially receive the vertical stresses and the lower suspension points receive the horizontal stresses.

Differing from the wheel suspensions described with reference to Figs. 1 and 2, one can use the fastening points provided in the metal sheet of the body 1 and in the cross-piece 6 lying between the frame members for the mounting of metal sheet cross-pieces or of other suspension elements maintained spaced from the body by damping rubber blocks. Owing to this fact, one obtains a new damping of the shocks transmitted by the wheels. Fig. 3 shows such a cross-piece 9 mounted, with interposition of rubber blocks 11, betweeen the upper suspension points 4 of part of the body according to Fig. 1. In the lower points of suspension 5 elements are arranged, also with interposition of rubber blocks 11, in a similar manner to those of Fig. 5 and serve, as may be seen from Fig. 4, as a support 10 for the upper points of suspension for the axes *ef, gh,* again with interposition of rubber blocks 11, on the upper edge of the body. As may be seen from Fig. 4, this arrangement of the points of suspension is particularly suitable for a perfect absorption of all the stresses transmitted from the rear wheels.

For insuring the synchronism of the rear wheels a cross-piece 12 shown separately in Fig. 6 is advantageously secured below the floor of the body and, in fact, in the points of suspension of the metal sheet band or flange 8, said fastening being effected, however, with interposition of rubber blocks 11. Said cross-piece 12 also offers the particular advantage that it confers a greater strength to the vehicles as regards all the stresses occurring horizontally.

The object of the invention makes it possible to do away with the heavy and cumbersome axles. Owing to this fact the vehicles are lighter and less expensive.

Of course, it is also applicable to the case in which only one axle of a motor vehicle, possibly the front axle, is done away with, while the rear axle is maintained in any form, for instance in the form of a torsion bar the free ends of which carry the axle pins.

What I claim and desire to secure by Letters Patent of the United States is:

1. In an automotive vehicle having a shell-like body and two longitudinal frame members in the front, the body having two inwardly directed and aligned flanges in a substantially horizontal plane above the frame members, each flange having an opening; front wheel suspension means for the vehicle comprising a cross-piece transversely disposed between the frame members and extended outwardly on either side thereof, each extended end of the cross-piece having an opening aligned with the opening in the corresponding flange, means coacting with the aligned openings in the flanges and cross-piece rotatably supporting a wheel on each side of the body, and means dampening the forces transmitted by the wheels to the flanges and cross-piece.

2. In an automotive vehicle having a shell-like body and two longitudinal frame members in the front, according to claim 1 in which the means dampening the forces transmitted by the wheels to the flanges and cross-piece comprises at least a second-cross piece mounted with the interposition of rubber blocks between the flanges of the shell-like body.

3. In an automotive vehicle having a shell-like body and a floor at the back; rear wheel suspension means for the body comprising a flange integrally formed with the sides of the body, the flanges being aligned in a substantially horizontal plane and having two spaced openings formed therethrough, an integrally formed extension on each side of the floor aligned with the flanges and having two spaced openings formed therethrough aligned with the openings in the flanges, means coacting with the aligned openings in each corresponding flange and floor extension rotatably supporting a rear wheel, and means dampening the forces transmitted by the wheels comprising at least a cross-piece disposed between the floor extensions by the interposition of rubber blocks.

GASTON CHAUSSON.

REFERENCES CITED

The following references are of record in the file of this patent:

UNITED STATES PATENTS

| Number | Name | Date |
|---|---|---|
| 1,208,572 | Kingsbury | Dec. 12, 1916 |
| 1,483,650 | Corbin, Jr. | Feb. 12, 1924 |
| 1,967,425 | Petersen | July 24, 1934 |
| 2,036,813 | Kraeft | April 7, 1936 |
| 2,054,644 | Wulfert | Sept. 15, 1936 |
| 2,084,694 | Martin | June 22, 1937 |
| 2,146,665 | Wood | Feb. 7, 1939 |
| 2,157,075 | Grade | May 2, 1939 |
| 2,190,551 | Swallow | Feb. 13, 1940 |
| 2,225,914 | Lewis et al. | Dec. 24, 1940 |
| 2,349,940 | Craig | May 30, 1944 |
| 2,374,911 | Barenyi et al. | May 1, 1945 |

FOREIGN PATENTS

| Number | Country | Date |
|---|---|---|
| 166,465 | Great Britain | July 21, 1921 |
| 723,471 | France | Jan. 18, 1932 |
| 501,640 | Great Britain | Feb. 27, 1939 |